Figure 7:
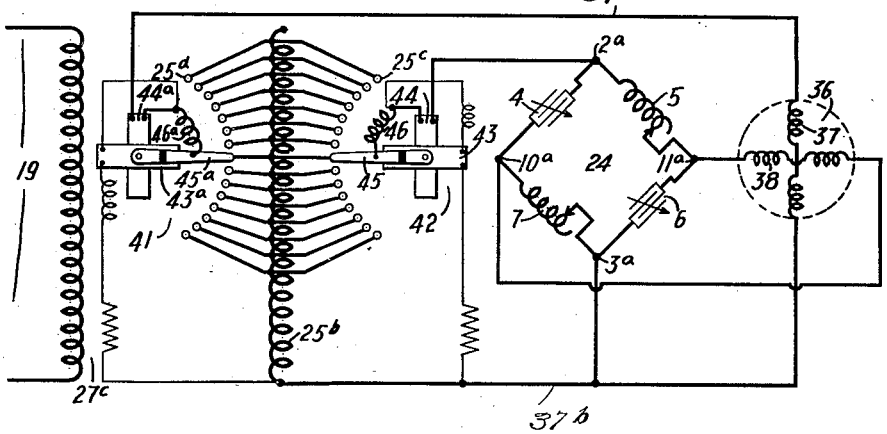

C. LE G. FORTESCUE.
SYSTEM OF DISTRIBUTION.
APPLICATION FILED MAR. 13, 1916.
1,284,293.
Patented Nov. 12, 1918.
4 SHEETS—SHEET 1.
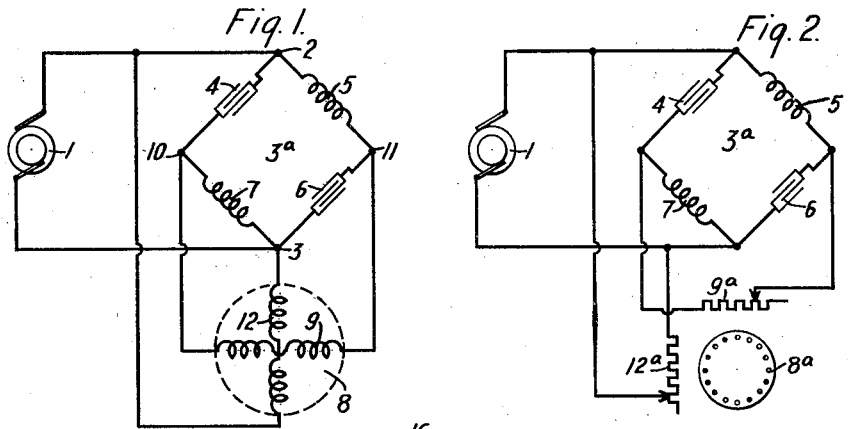
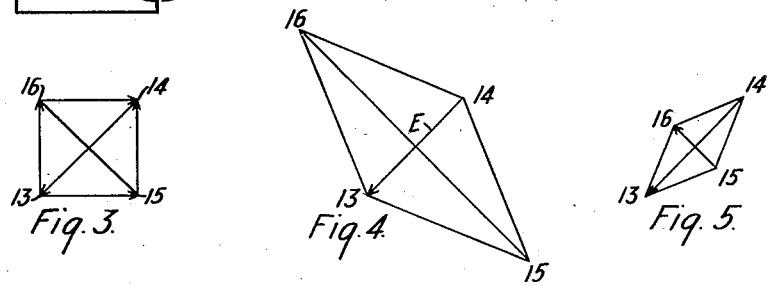
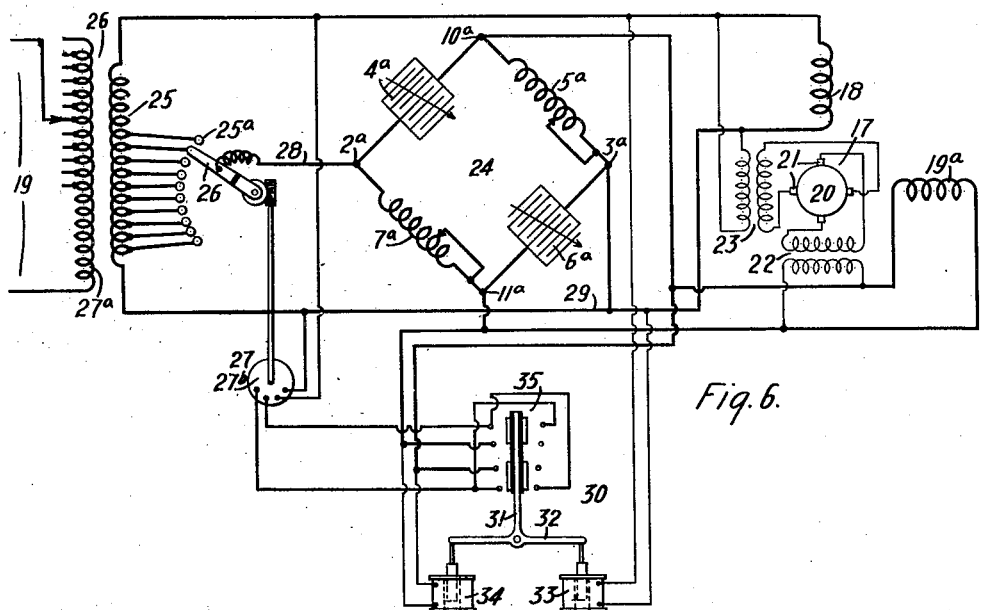
WITNESSES:
Fred. A. Lind.
Geo. W. Hansen.
INVENTOR
Charles LeG. Fortescue
BY
Wesley G. Carr
ATTORNEY

C. LE G. FORTESCUE.
SYSTEM OF DISTRIBUTION.
APPLICATION FILED MAR. 13, 1916.

1,284,293.

Patented Nov. 12, 1918.
4 SHEETS—SHEET 2.

WITNESSES:
Fred. A. Lind.
Geo. W. Hansen.

INVENTOR
Charles LeG. Fortescue
BY
ATTORNEY

C. LE G. FORTESCUE.
SYSTEM OF DISTRIBUTION.
APPLICATION FILED MAR. 13, 1916.

1,284,293.

Patented Nov. 12, 1918.
4 SHEETS—SHEET 4.

WITNESSES:
Fred. A. Lind.
Geo. W. Hansen.

INVENTOR
Charles LeG. Fortescue
BY
Wesley G. Carr
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF DISTRIBUTION.

1,284,293.  Specification of Letters Patent.  Patented Nov. 12, 1918.

Application filed March 13, 1916. Serial No. 83,748.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Systems of Distribution, of which the following is a specification.

My invention relates to alternating-current distributing systems for polyphase electrical apparatus, such as motors, generators, rotary converters and the like, and more particularly to phase-splitting devices and control systems therefor whereby polyphase apparatus may operate on single-phase power-supply circuits.

More particularly, my invention relates to distributing systems whereby polyphase apparatus, such as indicated above, may be operated on single-phase circuits through the intermediary of phase-splitting devices with results comparable to, or better than, those obtained when operating on polyphase circuits of the usual character, while the electrical conditions obtaining in both the single-phase and polyphase circuits may be regulated independently of one another.

It is known that, when four elements which offer equal reactances to currents of the same frequency, two of said elements being condensive and two being inductive, are so connected in a closed circuit as to alternate in position with one another, and an alternating current voltage of constant value and the proper frequency is impressed across two opposite points of the closed circuit, current of constant value may be obtained in a single circuit that is connected across the other two opposite points of the closed circuit. This arrangement of reactance elements in which the current flowing in the constant-current receiving circuit is maintained under certain conditions 90 degrees out of phase relationship with the constant voltage impressed by the constant-potential supply circuit has been termed a "monocyclic square."

I propose to utilize a modified form of the afore-mentioned so-called monocyclic square arrangement as a phase-splitting device which permits a polyphase motor, generator, rotary converter or the like to be operated from a single-phase power-supply circuit by reason of the phase-modification effected by my arrangement of the so-called monocyclic square which I will designate as a "bridge." In this bridge arrangement, the several reactances are so selected that, when a voltage of a certain predetermined frequency is impressed across one diagonal of the bridge, a second voltage of the same frequency obtains across the other diagonal of the bridge, this second voltage being displaced in phase relationship from the first said voltage and its value and degree of displacement being varied by properly controlling the electrical constants of the several reactances comprising the bridge or by regulating the voltage impressed thereupon, as will be hereinafter disclosed.

An object of my invention is to provide means whereby polyphase apparatus may be economically and efficiently operated from a single-phase supply circuit through a phase-splitting device which resembles, in a degree, the so-called mono-cyclic square arrangement of reactance elements, and also to provide means for so controlling the phase-splitting device as to insure the maintenance of balanced polyphase conditions in the polyphase distributing circuit under all load conditions of whatever character.

Figure 8:
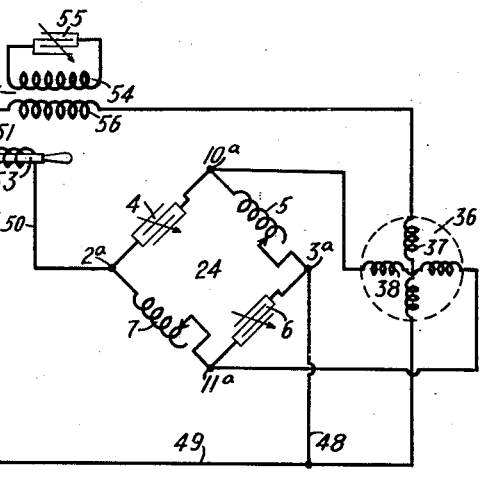
Figure 9:
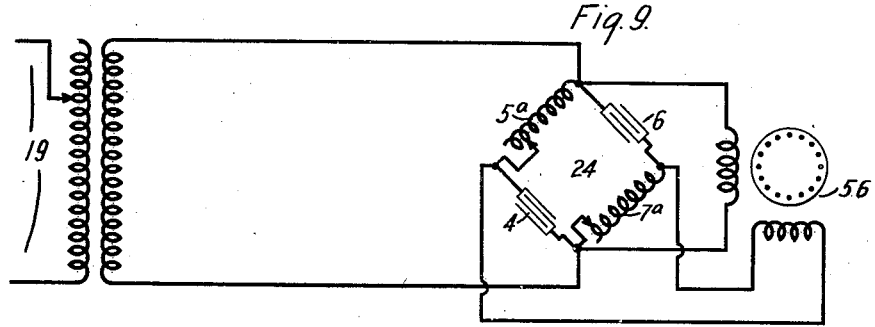
Figure 10:
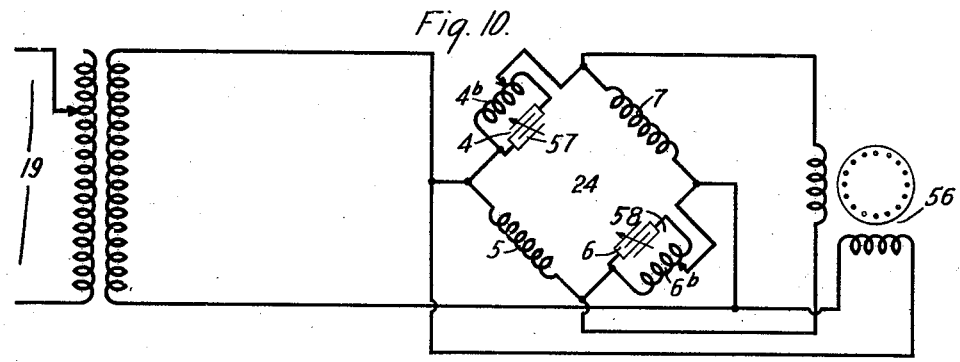
Figure 11:
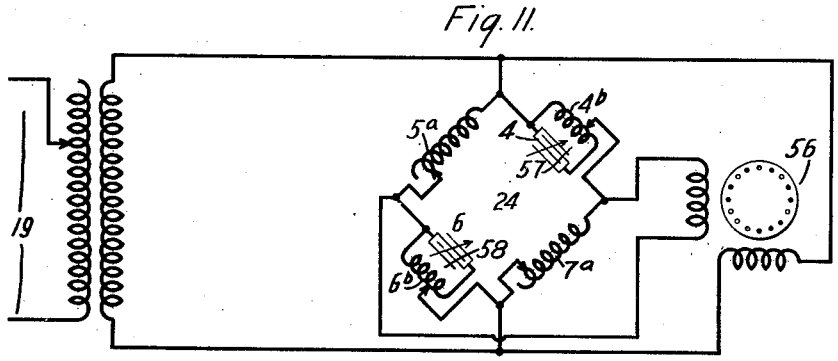
Figure 12:
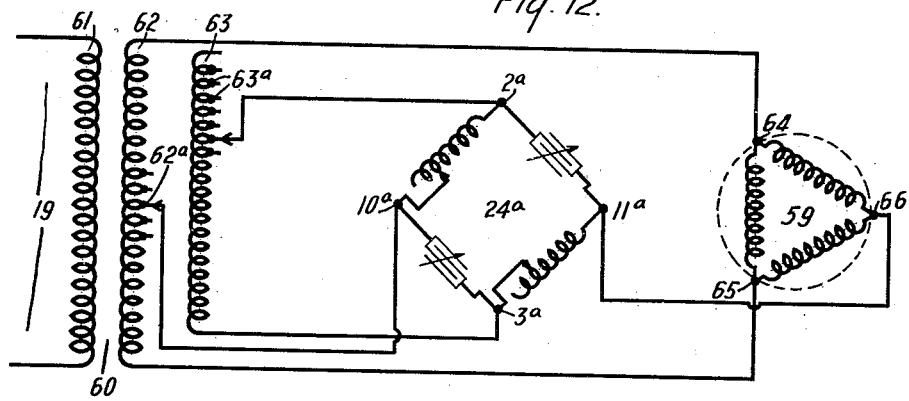
Figure 13:
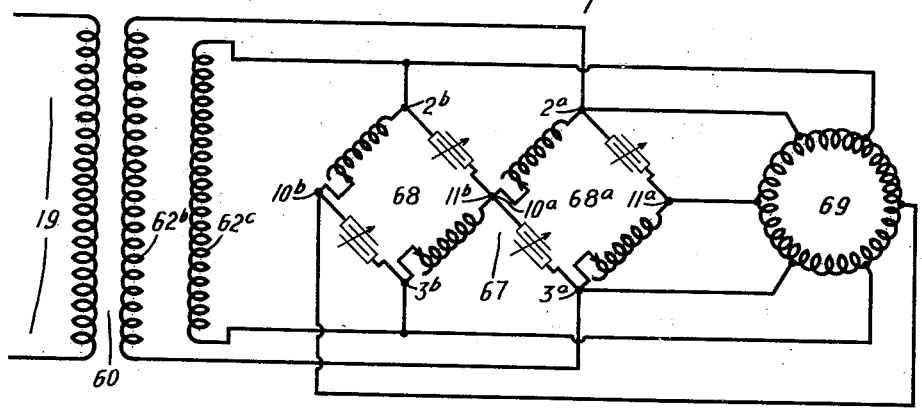
Figure 14:
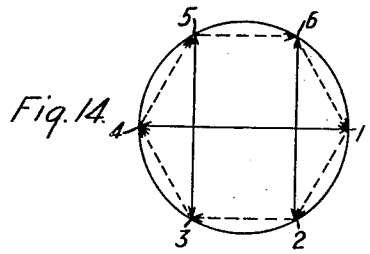

For a better understanding of the nature and scope of my invention, reference may be had to the following description and the accompanying drawings which illustrate diagrammatically several embodiments of my invention; Figures 1 and 2 show, in simple diagram, a method of operating a polyphase apparatus on a single-phase circuit; Figs. 3, 4 and 5 are vector diagrams illustrating the phase relationships between the polyphase voltages that may obtain under certain conditions of load in the polyphase distributing circuit; Fig. 6 shows a polyphase load designed to operate at unity power factor supplied with polyphase alternating currents through a phase-splitting device which is controlled automatically to maintain strict polyphase conditions in the polyphase circuit under all load conditions; Fig. 7 shows a control system whereby a motor may operate at a constant power factor from a single-phase circuit through a phase splitting device embodying a form of my invention, and, at the same time, maintain unity power factor upon the single-phase supply circuit; Fig. 8 shows a modified form of the system shown in Fig. 7 whereby the polyphase apparatus may be supplied with alternating currents in strict polyphase relationship under all load conditions; Figs. 9, 10 and 11 show modified forms of the systems shown in the preceding figures whereby regulation of the polyphase currents may be effected in various ways; Fig. 12 shows my phase-splitting device inserted intermediate a single-phase supply circuit and a three-phase distributing circuit; Fig. 13 shows my phase-splitting device inserted intermediate a single-phase power-supply circuit and a six-phase distributing circuit, and Fig. 14 is a vector diagram illustrating the phase relationships between the electromotive forces impressed upon the six-phase polyphase device of Fig. 13.

Referring to Fig. 1, a single-phase alternator 1 of a certain frequency is connected to points 2 and 3 which constitute one pair of opposite points of a closed circuit $3^a$ comprising reactive elements 4, 5, 6 and 7, the elements 4 and 6 being condensers that have identical electrical characteristics, and the elements 5 and 7 being inductive reactors that have identical electrical characteristics, the several elements alternating in position to form a closed circuit, as shown. The polyphase apparatus 8, shown as a two-phase motor, has one of its phase windings 9 connected to points 10 and 11 which constitute the other pair of opposite points of the closed circuit or bridge $3^a$. Another phase winding 12 of the motor 8 is directly connected across the mains extending from the single-phase alternator 1. Under certain conditions, the voltages supplied to the phase windings 9 and 12 of the motor 8 will be in balanced polyphase relationship, that is, they will be equal to, and displaced 90 degrees in phase relationship from, each other. It will be noted, therefore, that the phase winding 9 is supplied with power or energy from the phase-splitting device or bridge $3^a$ inserted therebetween and the single-phase alternator 1. Of course, the phase winding 12 is supplied with power directly from the single-phase alternator 1, and, therefore, the motor 8 will operate as a polyphase motor, since each phase thereof is supplied with energy.

In Fig. 2, the motor circuits or phase windings 9 and 12 of Fig. 1 are represented by adjustable non-inductive resistance elements $9^a$ and $12^a$, respectively. If the electrical constants of the reactance elements 4, 5, 6 and 7 of the bridge are properly adjusted and the resistance of the windings $9^a$ and $12^a$ are equal, the alternating-current voltages severally impressed upon the two phases of the motor $8^a$ will be equal to each other and in quadrature. This balanced polyphase relationship will, with the arrangement shown, be maintained since the motor $8^a$ operates at unity power factor and under a constant predetermined load in accordance with which the elements of the bridge have been previously selected.

The vector diagram of Fig. 3 illustrates the polyphase relationship of the voltages impressed upon the windings $9^a$ and $12^a$ of the motor of Fig. 2. The vector 13—14 represents the electromotive force impressed upon the winding $12^a$, and the vector 15—16 represents the electromotive force impressed upon the winding $9^a$, the last-named vector being the resultant of vectors 14—16 and 14—15 and also of vectors 13—15 and 13—16. These component vectors, namely, the vectors 14—15 and 13—16, represent the electromotive forces impressed across the inductive reactors 5 and 7 of the bridge, and the vectors 16—14 and 15—13 represent the electromotive forces impressed across the condensers 4 and 6 of the bridge.

As mentioned above, the reactance elements comprising the bridge $3^a$ are selected in accordance with the phase currents necessary for sustaining a predetermined load upon the motor $8^a$, which, for simplicity, is represented as one operating at unity power factor under all load conditions. As the load upon the motor varies, resulting in a change in the currents supplied thereto, the voltage impressed upon the phase winding $9^a$ of the motor will change likewise which causes an abnormally high or low difference of potential to exist across one of the diagonals of the bridge, depending upon whether the current supplied to the bridge-fed phase of the motor $8^a$ decreases below or increases above the value obtaining under the predetermined load. To illustrate, suppose that the value of the resistance $9^a$ is increased a substantial amount over the value of the resistance $12^a$. The vectors of the square arrangement of Fig. 3 will, in this case, assume a configuration such as represented in Fig. 4, the vector 13—14 being maintained constant by reason of the constancy of the supply voltage of the alternator 1, and the vector 15—16 being elongated, as shown, by reason of the decreased currents supplied to the bridge-fed phase winding $9^a$. The component vectors of Fig. 3 will be displaced and elongated, as shown, by reason of the inequality of the currents supplied to the two phases $9^a$ and $12^a$ since the bridge $3^a$ is designed to maintain balanced polyphase relationships only when the currents supplied to the two phases are equal. Again, suppose that the resistance of the winding $9^a$ is substantially decreased below its normal value, thereby resulting in an increased current flow therethrough. The conditions now obtaining are represented by the vector diagram of Fig. 5 in which the vector 13—14 is maintained constant in value and in position, as mentioned above, and the vector 15—16 is decreased in value by reason of the increased current flow through the winding 9ª, while the components representing the voltages impressed upon the elements 4, 5, 6 and 7 of the bridge are decreased in value. Since the windings 9ª and 12ª are represented as non-inductive windings, the vectors 13—14 and 15—16 will, at all times, be displaced 90 degrees in phase, but they will not be equal in value under all conditions, as I have explained above. If the windings 9ª and 12ª were inductive, and of such characteristics as to require alternating currents of different and varying power factors, the vectors 13—14 and 15—16 would be displaced in phase relationship different amounts, as well as, being rendered unequal in value under the various loads imposed on the motor 8ª. From the foregoing description, it will be apparent, therefore, that the balancing of the voltages impressed upon the several phases of the motor will be disturbed under varying load conditions unless means are provided for maintaining them in substantially balanced polyphase relationships.

When the polyphase apparatus is of a particular character, the voltages impressed upon the several phases thereof may be maintained in balanced polyphase relationship by properly varying the voltage impressed upon the bridge which results in varying the derived voltage. A system embodying this method of control is illustrated in Fig. 6 in which a two-phase compensated induction motor 17 is supplied with polyphase currents, under all load conditions, through a bridge arrangement 24 from the single-phase circuit 19. The motor 17 is of a well known form of construction and is designed to operate at substantially unity power factor at all loads. It comprises two exciting windings 18 and 19ª which are severally furnished with two-phase currents and a rotor 20 which is provided with a commutator having brushes 21 spaced thereupon as shown, the several pairs of brushes being furnished with alternating currents through voltage transformers 22 and 23.

The bridge 24 comprises adjustable condensive reactance elements 4ª and 6ª and adjustable inductive reactance elements 5ª and 7ª connected in closed circuit, as shown. The phase winding 18 of the motor 17 is connected directly across a secondary winding 25 of a transformer 26, a primary winding 27ª of which is connected to the single-phase supply circuit 19. The secondary winding 25 is provided with a plurality of adjustable taps 25ª which are adapted to be engaged by a conducting arm 26 of a voltage-regulating device 27. The conducting arm 26 is connected through a conductor 28 to a point 2ª of the bridge 24, the opposite point 3ª thereof being connected to a conductor 29 that is connected directly to the secondary winding 25. By varying the position of the conducting arm 26 of the voltage-regulating device 27, it will be noted that the voltage impressed upon the bridge 24 for excitation purposes may be regulated, as desired. The winding 19ª of the motor 17 is subjected to a voltage derived from the bridge 24 by being connected to the points 10ª and 11ª of the bridge 24. By properly regulating the value of the voltage impressed upon the bridge 24, an alternating current which is equal in value to, and in quadrature with, the current supplied to the phase winding 18 may be furnished to the phase winding 19ª.

To automatically maintain the polyphase relationship between the voltages and currents supplied to the several phases of the motor 17, I employ a control system which depends for its operation upon the difference in the values of the voltages impressed upon the windings 18 and 19ª. An auxiliary motor 27ᵇ actuates the conducting arm 26 to vary the exciting voltage impressed upon the bridge 24, as mentioned above. The operation and direction of movement of the motor 27ᵇ is controlled by a relay device 30 the arm 31 of which is actuated by a lever 32 having its ends attached to the core members of two electromagnets 33 and 34. The electromagnet 33 is connected across the phase winding 18 of the motor 17, and the electromagnet 34 is connected across the phase winding 19ª. As long as the voltages impressed upon the several phase windings of the motor 17 are equal, the pull exerted by the solenoid 33 will balance that exerted by the solenoid 34, and the switch arm will remain in its neutral position. When, however, the values of the component voltages change so that they are no longer equal, one solenoid will overbalance the other and actuate a switch 35 so as to start the motor 27ᵇ in the corresponding direction. As soon as the component voltages referred to are equalized, the pull exerted by solenoids will again be neutralized and the switch 35 will be restored to its neutral position. To illustrate the operation of the relay 30, consider the voltage impressed upon the winding 19ª by the bridge 24 as being less than the voltage impressed upon the winding 18. The pull exerted by the solenoid 33 will consequently overbalance that of the solenoid 34, and the switch 35 will operate to cause the motor 27ᵇ to revolve in such a direction as to increase the voltage to be impressed upon the bridge 24 which, as a consequence, causes the derived voltage, which is impressed upon the winding 19ª, to increase in value. As soon as the voltages impressed upon the windings 18 and 19ª are equalized, the switch 35 will operate to disconnect the motor 27ᵇ from circuit and thereby cause the arm 26 to remain stationary.

It will be noted that the voltages impressed upon the several phases of the motor 17 are maintained in balanced polyphase relationship under all load conditions by varying the voltage impressed upon the bridge 24, which, in turn, controls the value of the voltage to be impressed upon the phase winding 19ª of the motor. Since the motor 17 is designed to operate at unity power-factor, the power-factor obtaining in the single-phase supply circuit 19 will be unity, inasmuch as balanced polyphase conditions are automatically maintained in the load circuit.

In Fig. 7, a polyphase device or motor 36, which is not designed to operate at unity power factor, is furnished with polyphase alternating currents by reason of the insertion of the bridge 24 between it and the single-phase power-supply circuit 19. In this instance, one of the phase windings 37 is connected to the mains 37ª and 37ᵇ which are supplied directly with power from an adjustable secondary winding 25ᵇ of a transformer 27ᶜ. A phase winding 38 of the motor 36 is connected to the points 10ª and 11ª of the bridge 24, the points 2ª and 3ª thereof being connected to the secondary winding 25ᵇ, as will be hereinafter described. The motor 37 may be an induction motor of the usual type which does not operate at unity power factor but, however, may be made to operate at a constant power factor under all load conditions by varying the voltages impressed upon the several phase windings in accordance with the power delivered to them. Moreover, the voltages impressed upon the several phase windings may be maintained in balanced polyphase relationship under all load conditions if the voltages impressed upon the several phase windings are varied approximately as the square root of the quantities of power severally supplied to them.

A method for automatically controlling the voltages impressed upon the several phases of the motor 37 in accordance with the aforementioned conditions contemplates the use of devices 41 and 42 which operate on the wattmeter principle, and have, respectively, pivoted shunt coils 43 and 43ª connected across the variable active lengths of the secondary winding 25ᵇ and stationary series coils 44 and 44ª connected respectively to the phase windings of the motor. The stationary coil 44 of the wattmeter device 42 is connected directly to the bridge 24, and the series coil 44ª of the wattmeter device 41 is connected directly to the phase winding 37 of the motor 36. The shunt coils 43 and 43ª are severally provided with conducting arms 45 and 45ª, that are adapted to engage adjustable taps 25ᶜ and 25ᵈ, respectively, with which the secondary winding 25ᵇ is provided. It will be noted that the series coils 44 and 44ª are connected to the conducting arms 45 and 45ª through leads 46 and 46ª, respectively.

To illustrate the operation of this system, it will be apparent that, as the total power taken by the motor 36 varies in one direction or another from a predetermined value which, for convenience, may be designated as the normal value, the currents required in the separate phases of the motor 36 will likewise vary. The voltage impressed upon each of the phase windings 37 and 38 is separately controlled by reason of the operation of the two wattmeter devices 41 and 42 which are of similar design throughout so that their various operations may correspond to one another, but, at the same time, may permit the voltages impressed upon the several phases 37 and 38 to be independently regulated. As the currents supplied to the several phase windings of the motor 36 vary, the pivoted shunt coils 43 and 43ª will move the arms 45 and 45ª over the taps 25ᶜ and 25ᵈ, respectively, cutting transformer turns in or out of the phase winding circuits of the motor 36, as desired. It will be understood, however, that, in designing the transformer 27ᶜ and the wattmeter devices 41 and 42, consideration should be had of the fact that the turns of the secondary winding 25ᵇ cut in or out of circuit through the action of the conducting arms 45 and 45ª must be such as to vary the impressed voltages upon the several phase windings of the motor 36 in proportion to the square-root of the power required therein.

From the foregoing description, it will be observed that the control system described is adapted to maintain quadrature relationship between the voltages impressed upon the several phases of the motor 36 under all load conditions, and that the motor 36 will operate at a constant power factor under all load conditions since the voltages impressed upon its several phases are properly varied in accordance with the power supplied thereto, as mentioned above. If the motor 36 is designed to operate at unity power factor under all load conditions, the power factor obtaining in the single-phase supply circuit 19 will be maintained at unity as long as the adjusting relays 41 and 42 maintain strict polyphase relationship in the voltages and currents supplied to the several phases of the motor.

If the constants of the elements comprising the bridge 24 are properly adjusted or tuned so as to insure that the single-phase circuit 19 will operate at unity power factor while the motor 36 operates at a constant power factor, this condition will be maintained throughout the entire range of loads to which the motor 36 may be subjected. This regulation is effected through the power-factor devices 41 and 42 which operate independently of one another to insure the maintenance of balanced polyphase conditions in the polyphase circuit under all loads that may obtain therein. It is possible to maintain a constant power factor in the polyphase circuit at all times, even during the acceleration of the motor 36, by making suitable adjustments by means of the wattmeter - relay devices 41 and 42. However, in practice, it may be desirable to maintain such conditions for a few running speeds only of the motor, inasmuch as the unbalancing of the polyphase voltages and the wattless currents traversing the motor circuits during the acceleration periods are not appreciable when considering the general economy of the operation of the entire system.

As long as the motor 36 operates at a constant power factor or that for which the bridge 24 is tuned, unity power factor or a constant power factor will obtain in the single-phase circuit 19 since the wattmeter relays 41 and 42 will correspondingly operate to simultaneously engage similarly positioned taps upon the transformer winding 25$^b$. If the power factors of the motor circuits tend to vary from normal, the wattmeter devices 41 and 42 will independently operate to restore normal conditions in the polyphase circuit. For instance, if the motor 36 tends to operate with increasingly lagging currents, which condition would ordinarily obtain when heavy loads are imposed thereupon, the power factor obtaining in the single-phase circuit would result from the flow of an increasingly leading current therein which would establish a power factor having leading characteristics. This tendency is advantageous in the control and operation of the distributing system as a whole and is the inverse of the conditions obtaining in ordinary distributing circuits which do not embody phase-splitting bridges such as I have employed.

Referring to Fig. 8, I have shown a distributing system comprising a phase-splitting device that furnishes polyphase currents to the induction motor 36, and means associated therewith for maintaining unity power factor in the single-phase supply circuit while the motor 36 operates at a constant power factor and is subjected to voltages that are maintained in balanced polyphase relationship. In this instance, a secondary winding 25$^e$ of a transformer 27$^d$ is provided with a plurality of taps 47 which are adapted to be engaged by the conducting arm 45 of the wattmeter-relay device 42.

Both windings 37 and 38 of the motor 36 are furnished with alternating currents which simultaneously traverse the series coil 43 of the relay device 42. The shunt coil 44 of the relay 42, is in this case, connected directly across the varying active length of the secondary winding 25$^e$. The point 3$^a$ of the bridge 24 is connected through a conductor 48 and a main 49 to one terminal of the secondary winding 25$^e$, and the opposite point 2$^a$ of the bridge is connected through a conductor 50 and an adjustable inductive reactance device 51 to a conductor 52 which extends from the series coil 43 of the relay device 42. The reactor 51 is provided with an adjustable core member 53 for varying the impedance offered by the reactor to the flow therethrough of alternating currents. The phase winding 38 of the motor 36 is connected to the points 10$^a$ and 11$^a$ of the bridge 24 and has impressed thereupon the derived voltage obtained through the intermediary of the bridge.

The phase winding 37 of the motor is connected through a series transformer 53 to the common conductor 52, and also through the main 49 to the secondary winding 25$^e$. A secondary coil 54 of the series transformer 53 is connected in a closed circuit with an adjustable condensive reactance device 55. By reason of the inductive relationship between a primary winding 56 and the secondary winding 54, the condensive reactance afforded by the condenser 55 is inserted in circuit with the phase winding 37 of the motor 36.

It will be observed that the motor 36 is not adapted to operate at unity power factor under all load conditions, but I desire to have the same operate at a constant power factor while maintaining unity power factor, under all conditions, in the single-phase circuit 19. To this end, the constants of the reactive elements 4, 5, 6 and 7 of the bridge 24 are properly tuned in order that, in combination with the electrical qualities severally introduced in the polyphase circuits by the inductive reactor 51 and the condensive reactor 55, unity power factor may obtain in the single-phase circuit 19 irrespective of the position of the conducting arm 45 of the relay device 42. The phase windings 37 and 38 of the motor 36 operate at power factors resulting from lagging currents flowing therein.

The phase winding 37, because of its inductance, is connected in circuit with the condensive reactance 55, as explained above. The condenser element 55 may, therefore, be so adjusted that the current flowing in the circuit of the phase winding 36 will coincide in phase with the voltage impressed thereupon which results in one phase of the motor 36 operating at unity power factor.

The phase winding 38 is likewise inductive and, in consequence thereof, the current furnished to the bridge 24, assuming that the inductive reactor 51 is absent, will be leading. This results from the inherent properties of the bridge 24 which requires leading exciting current to be furnished to it when the derived circuit, in this instance the circuit comprising the phase winding 38, is inductive. With the absence of the reactor 51, the circuit comprising the arm 45, the flexible lead 46, the series coil 43, the conductor 50, the points $2^a$ and $3^a$ of the bridge 24, the conductors 48 and 49 and the active turns of the secondary winding $25^e$, requires a leading current. The adjustable inductive element 51 is added, therefore, to restore unity power factor in this circuit.

Since it is assumed, by way of explanation only, that the motor 36 operates at a predetermined constant power factor, under all load conditions, the elements 55 and 51 need be adjusted once only, since the relay device 42 is adjusted, as hereinbefore explained in connection with the system of Fig. 7, to automatically maintain balanced polyphase conditions in the circuits of the motor 36 which may operate at a constant power factor under all load conditions. Since the motor operates at a constant power factor, it necessarily operates at a constant slip at all loads which insures economical and efficient operating conditions in the polyphase circuit.

If the motor 36 operates at a constant power factor under all conditions, and the taps upon the winding $25^e$ are properly regulated in accordance with the power delivered to the motor, as hereinbefore mentioned, the reactors 51 and 55 need not be adjusted when different loads are imposed upon the motor. If the motor 36, however, operates at different power factors when subjected to different loads, the variable elements 4, 5, 6 and 7 of the bridge must be varied in order to maintain balanced polyphase conditions in the motor phase windings 37 and 38. In this instance, the wattmeter element 42 may vary the voltages impressed on the phase windings 37 and 38 when the power factors in the motor circuits do not vary over wide limits, such as obtains with slight variations in the loads imposed on the motor 36. When the load varies over wide limits, the elements of the bridge 42 must be varied in order to maintain balanced polyphase conditions in the motor circuits.

In order to maintain unity power factor in the single-phase circuit, the elements 55 and 51 must be adjusted, as explained above, in accordance with the power factors obtaining in the separate motor phase windings 37 and 38.

Since the voltage impressed on the phase winding 37 is equal to that impressed on the bridge 24 or across the points $2^a$ and $3^a$, the voltages severally obtaining across the elements 4, 5, 6 and 7 are, at all times, equal to one another and may be represented vectorally by a square formation because the voltage obtaining across the points $10^a$ and $11^a$ of the bridge is equal to that impressed across the points $2^a$ and $3^a$.

While complete power factor correction to unity may be obtained by the joint action of the reactors 51 and 55, either one may be employed alone, under reasonable variations in the motor loads, to insure efficient power factor correction. In this case, the inductive reactor 51 will usually be preferred for power-factor correcting purposes, inasmuch as the reactance of an inductive device may be conveniently varied, and the cost of furnishing such a device is usually relatively low.

While the motor 36 has been considered in the foregoing description as operating at a constant power factor, the power factor of the single-phase supply circuit 19 may be controlled by the adjustable reactors 55 and 51, irrespective of the power factors obtaining in the polyphase circuits of the motor 36. To illustrate, the single-phase power factor may be restored to unity by properly adjusting the reactors 55 and 51 when the motor 36 operates at a constant power factor, as explained above. When the motor 36 demands increased power input, while operating at the same constant power factor, the ratio between the condensive and the inductive admittances of the bridge must be maintained constant, although the said several admittances are increased in value in order to allow for the increased power input into the motor 36. Under this circumstance, the reactors 51 and 55 need not be readjusted unless it is desired to change the power factor of the single-phase circuit. When the power factor of the motor 36 varies, as is usual with ordinary motors under different load conditions, the ratio between the condensive and inductive admittances of the bridge must be changed, as well as the values of these admittances. In order to restore unity power factor in the single-phase circuit, the reactors 51 and 55 will, of necessity, be adjusted. It is, therefore, apparent that the power factor of the single-phase circuit may be controlled by varying the values of the reactors 51 and 55.

In Fig. 9, I have shown the bridge 24 as comprising two adjustable inductive reactors $5^a$ and $7^a$, and two condensive reactors 4 and 6. The inductive polyphase load is represented at 56 and the inductive reactors $5^a$ and $7^a$ are so adjusted in accordance with the loads impressed upon the motor 56 that the voltages impressed upon, and derived from, the bridge 24 will, under reasonable variations in load on the motor 56, be maintained in substantially balanced polyphase relationship. This same condition may be effected by employing inductive reactors 5 and 7 which are constant in value and variable condensive reactance devices 57 and 58 as shown in Fig. 10. In this instance, the condensers 4 and 6 are severally shunted by auto-transformer windings 4^b and 6^b, respectively which are provided with adjustable taps for varying the value of the condensive reactance that may be inserted in the corresponding arms of the bridge 24.

The systems shown in Figs. 9 and 10 admit of partial power-factor correction only, but, by utilizing inductive elements that are severally adjustable, such as are shown in the system of Fig. 11, complete power-factor correction may be effected. In this instance, all of the reactors comprising the bridge 24 are adjustable, and the electrical conditions obtaining in the four arms of the bridge may be varied in accordance with the varying loads imposed upon the motor 56 to maintain balanced polyphase conditions in the several circuits of the motor and, at the same time, insure the maintenance of unity power factor in the single-phase supply circuit 19.

In Figs. 9 and 10, the voltages impressed upon the bridge 24 may be varied by regulating or adjusting the transformer inserted between the single-phase circuit 19 and the polyphase device 56. If the voltages impressed upon the bridge 24 are varied in accordance with the loads imposed upon the motor 56, partial power-factor correction may be obtained in the single-phase circuit 19, and fairly satisfactory polyphase relations will exist in the circuits of the polyphase device 56. In Fig. 11, however, consider that the voltage impressed upon the bridge 24 is maintained constant. In consequence thereof, the motor 56 will operate at different power factors when subjected to different loads and, therefore, to maintain unity power factor under all load conditions in the polyphase circuits, the elements comprising the bridge 24 must be varied with the varying conditions obtaining in order to insure balanced polyphase relations in the polyphase circuit. Under these circumstances, the ratio between the inductive admittance and the capacity admittance of the bridge must be varied, as well as the values of the capacity and inductive admittances of the bridge. By varying both of these relations, the power-factor obtaining in the primary circuit 19 may be maintained at unity.

If the motor 56 operates at a constant power factor under all loads, the ratio between the inductive admittance and the capacity admittance of the bridge must be maintained constant to insure balanced polyphase relations in the polyphase circuit and a constant power factor in the single-phase supply circuit for which the voltage impressed on the bridge has been adjusted. It is therefore, apparent that, in order to maintain balanced relations between the voltages impressed upon the several phases of the motor 56 through the intermediary of the phase-splitting device or bridge 24 under all load conditions, it is necessary to maintain the potential differences between the two pairs of opposite points of the bridge equal, and this may be effected as mentioned above.

When the motor 56 operates at varying power factors under different load conditions, both of the above relationships, namely, the ratio between, and the product of the induction and the capacity of the several elements comprising the bridge must be simultaneously varied in order to insure balanced polyphase conditions in the polyphase circuits, as well as to maintain unity power factor in the single-phase circuit. From the foregoing description, it will be appreciated, therefore, that, by making all of the elements of the bridge 24 adjustable, and by connecting proper indicating devices, such as wattmeters and voltmeters, in circuit, the electrical constants of the several elements may be adjusted to obtain a wide latitude of conditions in the polyphase circuits.

In Fig. 12, I have shown my phase-splitting device inserted between the single-phase circuit 19 and a three-phase motor 59 in order to transform single-phase alternating currents into three-phase alternating currents. A transformer 60 is inserted between the single-phase circuit 19 and the three-phase motor 59, and has a single primary winding 61 and two secondary windings 62 and 63. The winding 62 comprises a full number of turns and is connected to points 64 and 65 of the delta-connected winding of the induction motor 59. The secondary winding 63 is provided with a plurality of adjustable taps 63^a and is connected to the points 2^a and 3^a of the tuned bridge 24^a. A mid-point tap 62^a of the winding 62 is connected to the point 10^a of the bridge 24^a, and the opposite point 11^a is connected to a terminal 66 of the three-phase motor winding 59. The voltage obtaining across the diagonal 10^a and 11^a of the bridge 24^a should be equal to 86.6 per cent. of the voltage impressed across the terminals 64 and 65 of the motor 59. When this condition obtains, three-phase voltages in balanced polyphase relationship are impressed upon the terminals of the winding 59, if the voltage vector representing the voltage across the diagonal 10^a and 11^a of the bridge is in quadrature with the voltage vector representing the voltage obtaining in the secondary winding 62 of the transformer 60. Three-phase conditions may also be obtained in the polyphase circuit by varying the taps 62$^a$ and the taps 63$^a$ of the transformer secondary windings, and also by varying the electrical constants of the reactors comprising the bridge 24$^a$.

In Fig. 13, I have illustrated a distributing system by means of which six-phase currents may be obtained from the single-phase circuit 19 through the intermediary of a phase-splitting device 67 which comprises two bridges 68 and 68$^a$ which are interconnected, as shown. The secondary winding 62$^b$ of the transformer 60 is connected to the points 2$^a$ and 3$^a$ of the bridge 68$^a$, and the secondary winding 62$^c$ is connected to the points 2$^b$ and 3$^b$ of the bridge 68. The points 10$^a$ of the bridge 68$^a$ and 11$^b$ of the bridge 68 are directly connected to each other. It will be apparent, therefore, that the voltage obtaining between the point 10$^b$ of the bridge 68 and the point 11$^a$ of the bridge 68$^a$ which will be in quadrature, on properly adjusting the electrical constants of the several elements comprising the bridges, with the electromotive forces obtaining between the points 2$^b$ and 3$^b$ of the bridge 68 and between the points 2$^a$ and 3$^a$ of the bridge 68$^a$.

In Fig. 14, the vector 1—4 represents the voltage obtaining between the points 10$^b$ and 11$^a$ of the phase splitting device 67 of Fig. 13, and may be considered as equal to unity. The vector 3—5 which is in quadrature with the vector 1—4 and equal to 86.6 per cent. thereof represents the voltage obtaining between the points 2$^b$ and 3$^b$ of the bridge 68 and, similarly, the vector 2—6 represents the voltage obtaining between the points 2$^a$ and 3$^a$ of the bridge 68$^a$. The proper values of the voltages are obtained by suitably varying the electrical constants of the reactors comprising the bridges 68 and 68$^a$. The position of the vectors 3—5 and 2—6 with respect to the vector 1—4 are such that the voltages obtaining between the pairs of points 1—2, 2—3, 3—4, 4—5, 5—6, and 6—1 are equal to, and displaced 60 degrees from, one another, thereby providing six-phase voltages for exciting the six-phase apparatus 69 of Fig. 13.

While I have considered the polyphase circuits as deriving energy from the single-phase circuit, it will be apparent that my invention may be employed for regenerating purposes in which the polyphase circuits constitute the energizing circuits and the single-phase circuit, the one deriving energy through the regenerating functions performed by my bridge or phase-splitting device.

It will be understood that my present invention is not limited to the forms specifically illustrated and described, but is capable of various other embodiments, and I desire, therefore, that only such limitations shall be imposed as are indicated in the appended claims.

I claim as my invention:

1. The combination with a single-phase power-supply circuit and polyphase load circuits, of a phase-splitting device comprising a plurality of condensive and inductive reactance elements alternating in position with one another in a closed circuit for furnishing polyphase currents to said polyphase circuits, and means for maintaining a constant power factor in the polyphase load circuit, when unity power factor obtains in the single-phase circuit.

2. The combination with a single-phase power-supply circuit and polyphase load circuits, of a phase-splitting device comprising a plurality of adjustable condensive and adjustable inductive reactance elements alternating in position with one another in a closed circuit for furnishing polyphase currents to said load circuits, the ratio between the inductive and capacity admittances of said phase-splitting device being so adjusted that unity power-factor obtains in the single-phase supply circuit when the polyphase load circuits operate at a predetermined power factor, and means for maintaining the power factor of the polyphase load circuits at the aforesaid predetermined value under all load conditions.

3. The combination with a single-phase power-supply circuit and polyphase load circuits, of a phase-splitting device comprising a plurality of adjustable condensive and inductive reactance elements alternating in position with one another in a closed circuit for furnishing polyphase currents to said load circuits, the ratio between the inductive and capacity admittances of said phase-splitting device being so adjusted that a power-factor of predetermined value may obtain in the single-phase supply circuit when the polyphase load circuits operate at a predetermined power-factor, and means for maintaining the power-factor of the polyphase load circuits at the said predetermined value under all load conditions.

4. The combination with a single-phase power-supply circuit and polyphase load circuits, of a phase-splitting device comprising a plurality of adjustable condensive and inductive reactance elements alternating in position with one another in a closed circuit for furnishing polyphase currents to said load circuits, and automatic means for adjusting the ratio between the inductive and capacity admittances of said phase-splitting device, as well as the values of the capacity and inductive reactors embodied therein, to simultaneously maintain substantially balanced polyphase conditions in said polyphase load circuits under all conditions and to substantially maintain unity power-factor in said single-phase circuit.

5. The combination with a single-phase power-supply circuit and polyphase load circuits, of a phase-splitting device to permit of an interchange of energy between said single-phase and polyphase circuits, said phase-splitting device comprising a plurality of condensive and inductive reactance elements alternating in position with one another in a closed circuit, an adjustable transformer for varying the exciting voltage applied to said phase-splitting device, and automatic means depending upon the electrical conditions obtaining in the polyphase load circuits for controlling the value of the voltage impressed upon said phase-splitting device.

6. The combination with a single-phase power-supply circuit and polyphase load circuits, of a phase-splitting device for interconnecting the polyphase load circuits and the single-phase supply circuit, said phase-splitting device comprising a plurality of adjustable inductive and condensive reactance elements that alternate in position with one another in a closed circuit, an adjustable transformer having its primary winding connected to said single-phase supply circuit and its secondary winding exciting said phase-splitting device, and automatic means responsive to conditions obtaining in said polyphase load circuits for varying the voltages applied to said polyphase load circuits in order that they may operate at a constant power factor and with balanced polyphase conditions under all loads.

7. The combination with a single-phase power-supply circuit and polyphase load circuits, of a phase-splitting device for interconnecting the polyphase circuits with the single-phase circuit, said phase-splitting device comprising adjustable inductive and adjustable condensive reactance elements alternating in position with one another in a closed circuit and the ratio between the condensive and inductive admittances of said phase-splitting device being so adjusted that unity power-factor is established in said single-phase circuit when a power-factor of predetermined value obtains in said polyphase circuits, and means for automatically maintaining under all load conditions, the aforementioned relations in both the single-phase and the polyphase circuits while and, at the same time, causing balanced polyphase conditions to be maintained in said polyphase circuits.

8. The combination with a single-phase power-supply circuit and polyphase load circuits, of a phase-splitting device for interconnecting said circuits with one another, said phase-splitting device comprising adjustable condensive and inductive reactance elements and the ratio between the inductive and condensive admittances of said phase-splitting device being so adjusted that balanced polyphase conditions will obtain in said polyphase circuits, and reactors of diverse electrical characteristics severally inserted between the single-phase power-supply circuit and said phase-splitting device in order to control the power-factor of the said single-phase circuit.

9. The combination with a single-phase circuit and a polyphase circuit, of a phase-splitting bridge comprising inductive and condensive reactance elements alternating in position with one another in a closed circuit for interconnecting said circuits with each other, the electrical constants of said elements being so adjusted that the reactances thereof will be equal in value to one another to establish resonant conditions for a predetermined frequency, and means for automatically maintaining the resonant conditions in said bridge, irrespective of the variations in the alternating currents supplied thereby.

10. The combination with a single-phase circuit and a two-phase circuit, of a phase-splitting bridge comprising inductive and condensive reactance elements alternating in position with one another in a closed circuit, means for connecting said single-phase circuit across one diagonal of said bridge, means for connecting one phase of said two-phase circuit across the other diagonal of said bridge, and means whereby the voltage impressed upon the bridge-phase is automatically maintained equal in value to, and 90 degrees in phase relationship from, the voltage impressed upon the other phase of the two-phase circuit, irrespective of the current flow therein.

11. The combination with a single-phase circuit and a polyphase circuit, of a phase-splitting bridge comprising inductive and condensive reactance elements alternating in position with one another in a closed circuit, means for connecting said single-phase circuit across one diagonal of the bridge, means for connecting one phase of the polyphase circuit across the other diagonal of the bridge, and means whereby the voltages impressed across the several phases of the polyphase circuit may be maintained equal to, and in strict polyphase relationship with, one another, irrespective of the currents flowing in the polyphase circuit.

12. The combination with a single-phase circuit and a polyphase circuit, of a phase-splitting bridge comprising inductive and condensive reactance elements alternating in position with one another in a closed circuit, means for connecting said single-phase circuit across one diagonal of said bridge, means for connecting one phase of the polyphase circuit across the other diagonal of the bridge, and means controlled by the current flow in the phase of the polyphase circuit supplied with alternating current from said bridge, whereby the voltage impressed across said bridge-phase of the polyphase circuit may be maintained equal in value to, and in strict polyphase relationship with, the voltages impressed upon the other phases of the polyphase circuit.

In testimony whereof I have hereunto subscribed my name this 29th day of Feb., 1916.

CHARLES LE G. FORTESCUE.